United States Patent
Pophusen et al.

(10) Patent No.: US 6,833,429 B1
(45) Date of Patent: Dec. 21, 2004

(54) THERMOFORMABLE POLYAMIDES

(75) Inventors: Dirk Pophusen, Leverkusen (DE); Detlev Joachimi, Krefeld (DE); Jürgen Röhner, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/089,709

(22) PCT Filed: Sep. 26, 2000

(86) PCT No.: PCT/EP00/09372

§ 371 (c)(1),
(2), (4) Date: Apr. 1, 2002

(87) PCT Pub. No.: WO01/27202

PCT Pub. Date: Apr. 19, 2001

(30) Foreign Application Priority Data

Oct. 8, 1999 (DE) .......................... 199 48 850

(51) Int. Cl.[7] .......................... C08G 69/04; C08L 77/00; C08L 79/00; C08K 5/10
(52) U.S. Cl. ...................... 528/310; 528/322; 528/332; 525/423; 525/432; 524/600; 524/606
(58) Field of Search ................................ 528/310, 322, 528/332; 525/65, 178, 432, 423; 264/176.1, 211.21, 239; 524/600, 606

(56) References Cited

U.S. PATENT DOCUMENTS

| | | | | | |
|---|---|---|---|---|---|
| 4,332,767 A | * | 6/1982 | Kitanaka et al. | ............ | 264/322 |
| 4,673,723 A | * | 6/1987 | Cuzin | .......................... | 528/113 |
| 4,820,779 A | * | 4/1989 | Schoenberg | ................ | 525/533 |
| 4,845,168 A | * | 7/1989 | Dykes et al. | ............... | 525/423 |
| 4,996,268 A | * | 2/1991 | Schoenberg | ................ | 525/434 |
| 5,324,795 A | * | 6/1994 | Suenaga | .................... | 525/444 |
| 5,605,945 A | | 2/1997 | Sayed et al. | ................ | 523/440 |
| 5,639,819 A | * | 6/1997 | Farkas et al. | ............... | 524/606 |
| 5,674,952 A | | 10/1997 | Onishi et al. | ................ | 525/432 |
| 2003/0162900 A1 | * | 8/2003 | Joachimi et al. | ............ | 525/178 |

FOREIGN PATENT DOCUMENTS

| | | |
|---|---|---|
| EP | 0 295 906 | 12/1988 |
| EP | 0 685 528 | 12/1995 |
| EP | 0 997 496 | 5/2000 |
| GB | 1032983 | 6/1966 |
| WO | 94/13740 | 6/1994 |
| WO | 00/39192 | 7/2000 |

* cited by examiner

Primary Examiner—P. Hampton Hightower
(74) Attorney, Agent, or Firm—Jill Denesvich; Godfried R. Akorli

(57) ABSTRACT

A reinforced polyamide molding composition is disclosed. Characterized in that its viscosity at a shear velocity of 10 s$^{-1}$ is greater than 1000 Pas and a shear velocity of 1000 s$^{-1}$ is less than 300 Pas, at processing temperatures of 40 to 80° C. above its melting point, the composition is particularly suitable for thermoforming applications.

10 Claims, No Drawings

THERMOFORMABLE POLYAMIDES

The present invention relates to glass fibre-reinforced polyamides and the use of the latter for thermoforming.

The thermoforming of thermoplastic semi-finished products has become increasingly important in recent years. Not least, the possibility of being able to develop prototypes quickly offers advantages compared to the more expensive rival processes such as injection moulding processes. Constantly improved thermoplastic materials enable the output to be increased with modern machinery and tools, combined at the same time with improved precision of the mouldings (Kunststoff Handbuch 3/4 "Polyamide", Hanser Verlag, Munich, Vienna).

Polyamides, and in the present context in particular reinforced polyamides from the group comprising partially crystalline thermoplastic materials, were hitherto largely excluded from thermoforming applications (Thermoformen in der Praxis, p. 45 ff, Hanser Verlag, Munich, Vienna). The very narrow processing window of this class of materials, which allowed forming to be carried out only just below the crystalline melting point, and the insufficient melt stabilities of these polymeric materials as a result of the low melt viscosities, enabled semi-finished products (sheets) produced therefrom to be formed only into very flat mouldings with low stretch/draw ratios and reduced shaping sharpness.

The thermoforming of films, which is often referred to as deep drawing, is known for polyamide films (single-layer, multi-layer, co-extruded or laminated) (Verpacken mit Kunststoffen, Hanser Verlag, Munich, Vienna). The person skilled in the art refers to films having a thickness of less than 1500 μm as suitable for deep drawing applications (Thermoformen, Hanser Verlag, Munich, Vienna, 1999).

The object therefore existed of providing a reinforced polyamide from which thermoplastic semi-finished products can be then produced having a material thickness of greater then 1.5 mm, from which in turn mouldings can be produced by thermoforming having a high degree of forming and a good shaping sharpness.

It has now surprisingly been found that polymeric materials from the class of materials of pseudoplastic reinforced polyamides, such as are described for example in EP-A 0 685 528, with a viscosity behaviour according to the invention, are extremely suitable for thermoforming. Degrees of forming can be obtained that are significantly better than those achievable with hitherto known materials. The materials also have a large forming temperature range.

These moulding compositions are characterised by their clearly defined pseudoplastic behaviour compared to standard polyamides. In other words, these moulding compositions have a significantly higher viscosity at low shear velocities compared to standard polyamides and comparably high viscosities at high shear velocities. This pseudoviscosity is achieved via an increased degree of branching of these polyamides. This can be achieved on the one hand in the primary condensation in a so-called VC tube, or also in a subsequent compounding.

The reinforcement of polyamides is carried out in a known manner by incorporating for example glass fibres or mineral fillers in the polyamide melt, for example from an extruder.

The present invention accordingly provides reinforced polyamide moulding compositions whose viscosity at a shear velocity of 10 $s^{-1}$ is greater than 1000 Pas and at a shear velocity of 1000 $s^{-1}$ is less than 300 Pas, at a processing temperature of 40 to 80° C. above the melting point of the relevant moulding composition.

Reinforced polyamide moulding compositions are preferred whose viscosity at a shear velocity of 10 $s^{-1}$ is greater than 1500 Pas and at a shear velocity of 1000 $s^{-1}$ is less than 280 Pas, at a processing temperature of 40–80° C. above the melting point of the relevant moulding composition.

The invention also provides for the use of these moulding compositions according to the invention for thermoforming.

It is preferred to use moulding compositions containing:
A) 98 to 41 parts by weight of thermoplastic partially crystalline polyamide and
B) 2 to 50 parts by weight of reinforcing materials
C) 0.1 to 4 parts by weight of branching additives and/or additives raising the molecular weight, for example diepoxide
D) 0 to 5 parts by weight of further additives, for example processing additives for thermoforming, colouring agents, carbon black, the sum of the parts by weight of A, B, C and D totalling 100, for thermoforming.

It is particularly preferred to use moulding compositions containing
A) 67 to 85 parts by weight of thermoplastic partially crystalline polyamide and
B) 15 to 30 parts by weight of reinforcing materials
C) 0.2 to 1 part by weight of branching additives and/or additives raising the molecular weight, for example diepoxide
D) 0.1 to 2 parts by weight of further additives, for example processing additives for thermoforming, colouring agents, carbon black, the sum of the parts by weight of A, B, C and D totalling 100, for thermoforming.

The application also provides thermoformed moulded bodies obtainable from the aforedescribed used moulding compositions.

Partially crystalline polyamides (PA), preferably PA 6, PA 66, PA 46, PA 610, PA 6/6T or partially crystalline copolyamides or mixtures based on these components are suitable as thermoplastic polyamide A).

The class of substances comprising polyamides is described in Kunststoff Handbuch 3/4 "Polyamide", Hanser Verlag, Munich, Vienna. This relates in particular to the production of the base resins (Chapter 2.1), as well as their modification (Chapter 2.3) and their reinforcement (Chapter 2.4).

A large number of procedures are known for producing polyamides, different monomer building blocks, various chain regulators for achieving a desired molecular weight or also monomers with reactive groups for subsequently intended post-treatment procedures being used depending on the desired end product.

The technically relevant processes for producing polyamides take place without exception via polycondensation in the melt. The hydrolytic polymerization of lactams is also understood as polycondensation in this context.

Preferred polyamides for the moulding compositions according to the invention are partially crystalline polyamides that can be produced starting from diamines and dicarboxylic acids and/or lactams having at least five ring members or corresponding amino acids.

Suitable starting products are preferably aliphatic dicarboxylic acids such as adipic acid, 2,2,4- and 2,4,4-trimethyladipic acid, azelaic acid, sebacic acid, aliphatic diamines such as hexamethylene diamine, 2,2,4- and 2,4,4-trimethylhexamethylene diamine, the isomeric diaminodicyclohexylmethanes, diaminodicyclohexylpropanes, bisaminomethylcyclohexane, aminocarboxylic acids such as aminocaproic acid and/or the corresponding lactams. Copolyamides of several of the aforementioned monomers are included.

Particularly preferred are caprolactams, and most particularly preferred is ε-caprolactam.

Polyamide 6 and/or polyamide 6,6 are particularly preferably used. Polyamide 6 is most particularly preferably used.

The polyamides produced according to the invention may also be used mixed with other polyamides and/or further polymers.

Commercially available glass fibres, carbon fibres, mineral fibres, fillers with or without surface treatment, etc., for polyamides, are used individually or in mixtures as reinforcing materials B). Preferred fibre-shaped or particle-shaped fillers and reinforcing materials are glass fibres, glass spheres, glass fabrics, glass mats, aramide fibres, carbon fibres, potassium titanate fibres, natural fibres, amorphous silicic acid, magnesium carbonate, barium sulfate, feldspar, mica, silicates, quartz, kaolin, talcum, titanium dioxide, wollastonite, i.a., which may also be surface treated. Particularly preferred reinforcing materials are commercially available glass fibres. The glass fibres, which generally have a fibre diameter of between 8 and 18 µm, may be added as endless fibres or as cut or ground glass fibres, in which connection the fibres may be treated with a suitable sizing system and a coupling agent or coupling agent system, for example based on silane.

As branching additives C) for the moulding compositions according to the invention, there are used for example commercially available diepoxides based on diglycidyl ether (bisphenol A and epichlorohydrin), based on aminoepoxide resins (aniline and epichlorohydrin), based on diglycidyl esters (cycloaliphatic dicarboxylic acids and epichlorohydrin) individually or in mixtures, as well as, preferably, diepoxides based on 2,2-bis[p-hydroyxphenyl]-propane diglycidyl ether, bis-[N-methyl-N-2,3-epoxypropylaminophenyl]-methane.

As component D there may be used conventional additives such as agents against thermal decomposition, agents against thermal crosslinking, agents against damage by UV light, platicisers, lubricants and mould release agents, nucleating agents, stabilisers, as well as dyes and pigments.

Examples of oxidation inhibitors and thermal stabilisers are sterically hindered phenols and/or phosphites, hydroquinones, aromatic secondary amines such as diphenylamines, various substituted members of these groups and their mixtures in concentrations of up to 1 wt. % referred to the weight of the thermoplastic moulding compositions.

As UV stabilisers, which are generally used in amounts of up to 2 wt. % referred to the moulding composition, there may be mentioned various substituted resorcinols, salicylates, benzotriazoles and benzophenones.

Inorganic pigments such as titanium dioxide, ultramarine blue, iron oxide and carbon black, and furthermore organic pigments such as phthalocyanines, quinacridones, perylenes as well as dyes such as anthraquinones may be added as colouring agents, together with other colouring agents.

As nucleating agents there may for example be used sodium phenyl phosphinate, aluminium oxide, silicon dioxide as well as, preferably, talcum.

Lubricants and mould release agents, which are conventionally used in amounts of up to 1 wt %, are preferably ester waxes, pentaerythritol stearate (PETS), long-chain fatty acids (for example stearic acid or behenic acid), their salts (e.g. Ca or Zn stearate) as well as amide derivatives (e.g. ethylene bis-stearylamide) and also low molecular weight polyethylene or polypropylene waxes.

Thermoforming (heat forming) is understood in this patent application to denote a production process in which a thermoplastic film or sheet is heated up to the softening point, is formed at low pressure in a tool, is cooled and then post-treated. All thermoplastic materials that can be produced as films or sheets are in principle also thermoformable, with the proviso that the temperature does not exceed the thermal stability of the material. The inherent strength should be sufficient to prevent an excessive sag resulting in tearing of the film or sheet. The thickness range of freely thermoformable semi-finished products extends from 0.1 mm thick films up to 10 mm thick sheets (Kunststoff Handbuch 3/4 "Polyamide" Hanser Verlag, Munich, Vienna, p. 459, 460.

In thermoforming only one side of the heated semi-finished product comes into contact with the forming tool. The surface contours of the forming tool are accurately reproduced on the application side of the semi-finished product. The contour and also the dimensions on the other side of the formed part are governed by the resulting wall thickness of the thermoformed part. In principle a distinction is made between positive and negative forming depending on whether the inside or outside of the formed part is brought into contact with the forming tool. The forming accuracy on the internal contour (positive forming) or on the external contour (negative forming) of the moulding is determined accordingly.

The basic advantages of thermoforming are inexpensive thermoforming tools, cheaper thermoforming machinery, and the possibility of also being able to process multi-layer materials, foamed substances and pre-printed semi-finished products ("Thermoformen in der Praxis", Schwarzmann, P., Hanser Verlag, Munich, Vienna, 1997).

EXAMPLES AND COMPARISON EXAMPLES

The following features were adopted for the evaluation of the quality of the thermoformed articles:

Degree of forming and stretch/draw ratio
 The degree of forming is the ratio of the maximum drawing depth H to the width B or the diameter D of the forming surface (clear width of the clamping frame surface).
 The stretch/draw ratio is the ratio of the surface of the moulding before trimming (without the clamping frame), to the moulding surface.

Thermoformability
 The forming behaviour is evaluated. The sheet-like semi-finished product should exhibit a sufficient strength with low sag in the clamping frame during the heating phase and should easily be able to be shaped by the tool without producing melt overhangs and folds. The evaluation is made according to a points scale (1=very good, 6=unsatisfactory).

Wall thickness distribution
 The wall thickness of the individual stages of the mouldings produced with the multi-stage die is measured and the uniformity is evaluated. The arithmetic mean of the individual values of the stages, as well as the maximum deviation from the mean value referred to the mean value is determined for this purpose. The evaluation is made according to a points scale (1=very good, 6=unsatisfactory).

Shaping sharpness

The term shaping sharpness is understood to mean the accuracy of reproduction of the contours of the thermoforming tool on the moulding. Small radii and surface structures on the application side to the tool are mainly adopted as criteria.

The shaping in the corner region was evaluated. The evaluation was made on the basis of a points scale (I=very good shaping, 6=unsatisfactory shaping).

Mouldings are produced from the material used according to the invention and from comparison material, and are compared and evaluated.

The following products are used:
PA 6: Durethan® B 31 from Bayer AG (relative solution viscosity: 3, measured in 1% m-cresol solution at 25° C.)
Diepoxide: Rütapox 0162 from Bakelite AG (diepoxide based on bisphenol A and epichlorohydrin)
Glass fibres: CS 7923 from Bayer AG, Leverkusen, Germany
Additives: Nucleating agent (micronised talcum) Heat stabiliser (CuJ/alkali halides)
Carbon black Example B1

The components listed hereinafter were compounded in a twin-screw extruder (ZSK) from Werner & Pfleiderer (100 min$^{-1}$; 10 kg/h) at 265° C., extruded in a water bath, and granulated. The diepoxide was metered from a liquid metering pump into the feed section of the extruder.

| Description | Wt. % |
|---|---|
| PA 6 | 84% |
| Glass fibres | 15% |
| Diepoxide | 0.5% |
| Additives | 0.5% |

Comparison Example VB1

The components listed hereinafter were compounded in a twin-screw extruder from Werner & Pfleiderer (100 min$^{-1}$; 10 kg/h) at 265° C., extruded in a water bath and granulated.

| Description | Wt. % |
|---|---|
| PA 6 | 84.5% |
| Glass fibres | 15% |
| Additives | 0.5% |

Example B2

The components listed hereinafter were compounded in a twin-screw extruder from Werner & Pfleiderer (100 min$^{-1}$; 10 kg/h) at 265° C., extruded in a water bath and granulated. The diepoxide was metered from a liquid metering pump into the feed section of the extruder.

| Description | Wt. % |
|---|---|
| PA 6 | 68.8% |
| Glass fibres | 30% |
| Diepoxide | 0.5% |
| Carbon black | 0.2% |
| Additives | 0.5% |

Comparison Example VB2

The components listed hereinafter were compounded in a twin-screw extruder from Werner & Pfleiderer (100 min$^{-1}$; 10 kg/h) at 265° C., extruded in a water bath and granulated.

| Description | Wt. % |
|---|---|
| PA 6 | 69.3% |
| Glass fibres | 30% |
| Carbon black | 0.2% |
| Additives | 0.5% |

The granules obtained were in each case dried for 4 hours at ca. 70° C. in a vacuum drying cabinet.

The melt viscosities of the produced polymers were then measured in a capillary rheometer (DIN 54811-B) at various shear viscosities and temperatures. The measured values were in each case converted into the true shear velocities and true viscosities. The following table shows a comparison for three shear velocities at a melt temperature of $\theta_m$=280° C. (melting point of PA ca. 220° C.).

TABLE 1

| Viscosity at $\theta_m$ = 280° C. in Pas | B1 | VB1 | B2 | VB2 |
|---|---|---|---|---|
| Viscosity at shear velocity 10 s$^{-1}$ | 2100 | 340 | 2000 | 600 |
| Viscosity at shear velocity 1000 s$^{-1}$ | 250 | 130 | 220 | 290 |

The necessary sheet-like semi-finished products were made using the granules produced by way of example, in an extrusion unit. The polymer granules were extruded via an extruder through a slit die and withdrawn through a polishing stack and calibrated. Sheets 3 mm thick and 800 mm wide were thus produced in this way, and were cut into ca. 1100 mm long sections.

The sheet-like semi-finished products were thermoformed in a thermoforming unit from Illig (Type Illig UA 100 Thermoform-Anlage). A rectangular multi-stage die was used as thermoforming tool (TW), which enables different material behaviours to be evaluated easily. The multi-stage die that was used allows different drawing depths to be adjusted, by varying the number of the stages (3 stages/5 stages/7 stages). The individual stage height is in each case 30 mm.

The thermoformability, the wall thicknesses and the shaping sharpness were compared in each case for the adjusted stretch/draw ratios listed in the following table.

TABLE 2

| Tool Designation | No. of Stages | Drawing Depth | Degree of Forming | Stretch/Draw Ratio |
|---|---|---|---|---|
| TW7 | 7 | 210 mm | 82% | 241% |
| TW5 | 5 | 150 mm | 59% | 192% |
| TW3 | 3 | 90 mm | 35% | 153% |

The results obtained with the mouldings produced with the sheets extruded by way of example are reproduced in the following Table.

TABLE 3

| | B1 | VB1 | B2 | VB2 |
|---|---|---|---|---|
| Thermoformability with TW 3 | 1 | 3 | 1 | 3 |
| Wall thickness distribution with TW 3 | 1 | 4 | 1 | 3 |
| Shaping sharpness with TW 3 | 2 | 4 | 1 | 3 |
| Remarks | | Tears | | Tears |
| Thermoformability with TW 5 | 1 | 5 | 1 | 5 |
| Wall thickness distribution with TW 5 | 2 | 4 | 1 | 5 |
| Shaping sharpness with TW 5 | | 4 | 1 | 4 |
| Remarks | | Large holes | | Large holes |
| Thermoformability with TW 7 | 2 | 6 | 1 | 6 |
| Wall thickness distribution with TW 7 | 2 | 6 | 1 | 5 |
| Shaping sharpness with TW 7 | 2 | 5 | 1 | 6 |
| Remarks | | Thermoforming not possible | | Thermoforming not possible |

The quality was evaluated in this case using a points scale (1 very good, 6=unsatisfactory), see Description.

From Table 3 it can be seen that the examples according to the invention exhibit significantly better thermoformability, wall thickness distribution and shaping sharpness.

Thermoforming was carried out at adjusted surface temperatures of T=235° C. to 254° C. for B1 and B2, and also as T=225° C. up to 230° C. for VB1 and VB2.

What is claimed is:

1. A method of using a reinforced molding compositions wherein the resin is at least one member selected from the group consisting of (co)polyamide 6 and (co)polyamide 6,6 the composition characterized in that its viscosity at a shear velocity of $10\ s^{-1}$ is greater than $1000\ s^{-4}$ Pas, and at a shear velocity of $1000\ s^{-1}$ its viscosity is less than 300 Pas at a processing temperature that is 40 to 80° C. above the melting point of the molding composition, said method comprising preparing an article by thereforming.

2. The method of claim 1 wherein the viscosity is greater than 1500 Pas at shear velocity of $10\ s^{-1}$ and is less than 280 Pas at shear velocity of $1000\ s^{-1}$.

3. The method of claim 1 wherein the composition comprise A) 98 to 41 parts by weight of said resin and B) 2 to 50 parts by weight of reinforcing materials, and C) 0.1 to 4 parts by weight of branching additives and/or additives raising the molecular weight and D) 0 to 5 parts by weight of further additives, the sum of the parts by weight of A, B, C, D totaling 100.

4. The method of claim 1 wherein the composition comprise A) 67 to 85 parts by weight of said resin and B) 15 to 30 parts by weight of reinforcing materials, and C) 0.2 to 1 part by weight of branching additives and/or additives raising the molecular weight, D) 0.1 to 2 parts by weight of further additives, the sum of the parts by weight of A, B, C and D totaling 100.

5. The method of claim 3 wherein C is a diepoxide.
6. The method of claim 4 wherein C is a diepoxide.
7. A molded article obtained by the method of claim 1.
8. A molded article obtained by the method of claim 2.
9. A molded article obtained by the method of claim 3.
10. A molded article obtained by the method of claim 4.

* * * * *